United States Patent
Luts et al.

(10) Patent No.: US 10,981,838 B2
(45) Date of Patent: Apr. 20, 2021

(54) METHOD FOR PRODUCING SOLUBLE POTASSIUM SULFATE

(71) Applicant: TESSENDERLO CHEMIE N.V., Brussels (BE)

(72) Inventors: Peter Luts, Tessenderlo (BE); Nicolas White, Maresches (FR); Aurélien Claeys, Overijse (BE); Faye Maertens, Schaffen (BE); Georges Marinus Alfons Brockmans, Tessenderlo (BE)

(73) Assignee: TESSENDERLO GROUP NV, Brussels (BE)

( * ) Notice: Subject to any disclaimer, the term of this patent is extended or adjusted under 35 U.S.C. 154(b) by 238 days.

(21) Appl. No.: 16/086,619

(22) PCT Filed: Mar. 20, 2017

(86) PCT No.: PCT/EP2017/056491
§ 371 (c)(1),
(2) Date: Sep. 20, 2018

(87) PCT Pub. No.: WO2017/162547
PCT Pub. Date: Sep. 28, 2017

(65) Prior Publication Data
US 2019/0119175 A1   Apr. 25, 2019

(30) Foreign Application Priority Data

Mar. 21, 2016 (EP) .................... 16161478

(51) Int. Cl.
| C05D 1/02 | (2006.01) |
| C01D 5/16 | (2006.01) |
| A01C 21/00 | (2006.01) |
| A01G 22/25 | (2018.01) |
| A01G 22/00 | (2018.01) |
| A01G 22/45 | (2018.01) |
| A01G 22/20 | (2018.01) |
| A01G 22/22 | (2018.01) |
| A01G 22/50 | (2018.01) |
| A01G 22/05 | (2018.01) |

(52) U.S. Cl.
CPC ............... *C05D 1/02* (2013.01); *A01C 21/00* (2013.01); *C01D 5/16* (2013.01); *A01G 22/00* (2018.02); *A01G 22/05* (2018.02); *A01G 22/20* (2018.02); *A01G 22/22* (2018.02); *A01G 22/25* (2018.02); *A01G 22/45* (2018.02); *A01G 22/50* (2018.02); *C01P 2004/53* (2013.01); *C01P 2004/61* (2013.01); *C01P 2004/62* (2013.01); *C01P 2004/64* (2013.01); *C01P 2006/80* (2013.01)

(58) Field of Classification Search
CPC .. C05D 1/02; A01C 21/00; C01D 5/16; A01G 22/25; A01G 22/00; A01G 22/45; A01G 22/20; A01G 22/22; A01G 22/50; A01G 22/05; C01P 2004/53; C01P 2004/61; C01P 2004/62; C01P 2004/64; C01P 2006/80
USPC ...................................................... 23/302 R
See application file for complete search history.

(56) References Cited

U.S. PATENT DOCUMENTS

| 1,268,433 A | 6/1918 | Chappell |
| 8,840,706 B1 | 9/2014 | Srinivasachar |
| 91,399,446 | 9/2015 | Chastain |
| 2012/0273720 A1 | 11/2012 | Lee et al. |
| 2014/0332720 A1 | 11/2014 | Eom et al. |

FOREIGN PATENT DOCUMENTS

| CN | 103896683 A | 7/2014 |
| WO | 2014015243 A1 | 1/2014 |

OTHER PUBLICATIONS

Monica Puccini et al: "Lithium Silicate Pellets for CO2 Capture at High Temperature", Chemical Engineering Transactions, vol. 35, Nov. 1, 2013, pp. 373-378, XP055374672.

Naoya Shigemoto et al: "Material Balance and Energy Comsumption for CO 2 Recovery from Moist Flue Gas Employing K 2 CO 3 -on-Activated Carbon and Its Evaluation for Practical Adaptation", Energy & Fuels., vol. 20, No. 2, Feb. 17, 2006, pp. 721-726, XP055374715, Washington, DC, US.

M. E. Taboada et al: 11 Design of Alternative Purification Processes for Potassium Sulfate. Industrial & Engineering Chemistry Research .• vol. 44. No. 15. Jun. 14, 2005 (Jun. 14, 2005)• pp. 5845-5851. XP055276771. us ISSN: 0888-5885. DOI:10.1021/ie0503390.

(Continued)

*Primary Examiner* — Edward M Johnson
(74) *Attorney, Agent, or Firm* — David Owen; Hoyng Rokh Monegier

(57) ABSTRACT

Method for producing soluble potassium sulfate by recrystallization of crude potassium sulfate wherein the crude potassium sulfate contains an amount of potassium, calculated as $K_2O$, of about 15 wt % or higher, and the resulting potassium sulfate crystalline material conforms with the following characteristics: the amount of insoluble material is less than about 0.05 wt %, a 1 wt % solution of the potassium sulfate has a pH below about 6, and/or 1 pH unit lower than the pH of the crude potassium sulfate, the fraction obtained after crystallization has an average particle size within the following parameters: (i) d90<about 0.6 mm, (ii) d10>about 0.02 mm, and (iii) dust amounts to about 0.4 wt % or less, whereby the resulting potassium sulfate contains more than 51% potassium, calculated as $K_2O$.

17 Claims, No Drawings

(56) References Cited

OTHER PUBLICATIONS

W D Halstead: Behaviour of Potassium Sulphate in Aqueous Solutions Some Aspects of the Behaviour of Potassium Sulphate in Aqueous Solutions X a Journal of Applied Chemistry. vol. 1 •20. No. 2. Feb. 1, 1970 (Feb. 1, 1970). pages 45-47. XP055276798. DOI:10.1002bctb.5010200203.

Anonymous: 11 Specification sheet K- Leaf (TM) Apr. 12, 2013 (Apr. 12, 2013). pages 1-2. XP055276806. Retrieved from the Internet: URL:http://www.tessenderlo.com/binaries/IS09000foliar-gb tcm9-22762.pdf.

METHOD FOR PRODUCING SOLUBLE POTASSIUM SULFATE

FIELD OF THE INVENTION

The present invention relates to a method for producing good quality soluble potassium sulfate from potassium sulfate with relatively poor dissolution properties.

BACKGROUND OF THE INVENTION

Fertilizers have long been in use. Generally the soil is provided with necessary components like nitrogen (urea, nitrate), phosphorous (phosphate), potassium (as a salt), sulfur (sulfate, thiosulfate or sulfite), or by providing organic fertilizers.

Dissolved fertilizers are often used in fertigation and in foliar sprays. In fertigation for example, fertilizers are used for irrigating plants (fertigation) in for example green houses, high value crops or densely grown areas. Fertigation is also increasingly used to limit the amount of fertilizer provided to an area, because the fertilizer is used in a more efficient way. It also has become clear that applying fertilizers on the leaves of plants may be advantageous, because components can directly be taken up by the plant. Such fertilizers are dissolved in water and applied by spraying, which is denoted as foliar spray. Application of fertilizer in dissolved form, for fertigation and foliar sprays require high quality standards to preclude clogging of spray nozzles, in particular in drip, bubbler and or micro-fertigation and foliar applications.

Potassium sulfate (often called Sulfate of Potash, abbreviated as SOP) is a commonly used fertilizer for foliar spray and/or for fertigation. Potassium sulfate fertilizer for foliar use is used for e.g. tobacco, vegetables and fruit. The foliar application of potassium sulfate for broad acre crops include tuber or root crops such as potatoes or sugar beet; cereals like maize, rice, wheat, barley, grain and the like; or oil crops, like soy bean, sunflower, rape-seed or peanut; or other crops like clover, cotton or mustard. Such use for broad acre crops is less common but of increasing importance. Crops for fertigation include fruits, like strawberry, citrus and stone or pomme fruits, vegetables like beans, Cucurbitaceae, tomatoes, tea, coffee, tobacco and the like.

Potassium sulfate can be produced in a large number of processes.

The most common method of producing potassium sulfate is the Mannheim process, which is the reaction of potassium chloride with sulfuric acid at high temperatures. The raw materials are poured into the center of a muffle furnace heated to above 600° C. Potassium sulfate is produced, along with hydrochloric acid, in a two-step reaction via potassium bisulfate. This method for creating SOP accounts for 40% to 50% of global supply.

Another method involves the reaction of potassium chloride with various sulfate salts to form a double salt that can be decomposed to yield potassium sulfate. Common raw material employed for this purpose include sodium sulfate, magnesium sulfate or other sulfate containing salts. Sodium sulfate, either in the form of mirabilite (also known as Glauber's Salt) or sulfate brine, is treated with brine saturated with potassium chloride to produce glaserite. The glaserite is separated and treated with fresh potassium chloride brine, decomposing into potassium sulfate and sodium chloride. Magnesium sulfate (Hartsalz and/or kieserite) can be processed in a comparable way. Double salts may already comprise potassium, and several of the processes use Schoenite as an intermediate double salt to obtain potassium sulfate. These methods of production are the second greatest source of global supply at 25% to 30%.

Some operations produce potassium sulfate from the salt mixtures harvested from natural brines. This method requires brines with high sulfate levels such as those found within certain salt lakes. The sulfate is typically present in the harvest salts in the form of the double salt kainite, which is converted to schoenite by leaching with sulfate brine. The leach process may be hampered by high sodium chloride content in the harvest salts and the halite is first removed by flotation. After thickening, the Schoenite is decomposed by adding hot water, whereupon the magnesium sulfate enters solution leaving potassium sulfate crystals.

U.S. Pat. No. 1,268,433 describes the production of potassium sulfate and alumina from Alunite. Alunite has an amount of potassium, calculated as $K_2O$ of about 11 wt %.

Taboada et al. in Ind. Eng. Chem. Res. (2005) 44:5845-5851 discloses several methods of recristallization of potassium sulfate, either through evaporation of water, or in a drowning-out crystallization using propanol.

The potassium sulfate is supplied or sold as a crystalline powder and will be dissolved before use. However, many of these processes do not consistently, or not at all, produce potassium sulfate of a quality that can easily be dissolved so that it can be used in spray equipment or other liquid fertilizer-supply equipment (micro irrigation systems). For use in spray equipment or other liquid fertilizer supply equipment it is important that the potassium sulfate crystalline compound dissolves quickly and completely.

CN 103896683 describes a process for improving the quality of potassium sulfate for use as a dissolved, liquid fertilizer. However, the examples provide for potassium sulfate with a potassium content below 52% (calculated as $K_2O$), like for example 51.3, 51.5 and 51.8. Furthermore, the process requires addition of a number of compounds after crystallization.

K-Leaf™ is a foliar grade potassium sulfate product of Tessenderlo Group, having good solubilizing properties.

It is an object of the invention to provide a process for obtaining high quality, swiftly dissolving potassium sulfate from potassium sulfate having inferior dissolution properties.

SUMMARY OF THE INVENTION

The object of the invention is achieved by a method for producing potassium sulfate by (re)crystallization of crude potassium sulfate wherein the crude potassium sulfate before recrystallization contains an amount of potassium, calculated as $K_2O$ of about 15 wt % or higher, preferably about 40 wt % or higher, and has either:
  more than about 0.07 wt % insoluble material, and/or
  a dissolution speed wherein at 3 min dissolution of 100 gram product in 1 L cold water (20° C.), the amount of dissolved potassium sulfate is less than 90%, and/or
  a pH of about 6 or higher as a 1% dissolved crude potassium sulfate,
wherein the method comprises the following steps
  the crude potassium sulfate is dissolved,
  the dissolved potassium sulfate is subjected to a solid material removal step,
  potassium sulfate is crystallized,
  while optionally an acid is provided before, during or after the crystallization step of the potassium sulfate
  whereafter the obtained potassium sulfate is separated and dried wherein the particle size of the crystalline material is controlled to be within the ranges provided, optionally with sieving and/or grinding, preferably by sieving such that the resulting potassium sulfate crystalline material conforms with the following parameters:

the amount of insoluble material is less than about 0.05 wt %, a 1% solution of the potassium sulfate has a pH below about 6, and/or at least 1 pH unit lower than the pH of the crude potassium sulfate, the fraction obtained after crystallization has an average particle size within the following parameters:

d90 of about 0.6 mm or lower, d10 of about 0.02 mm or higher, and dust is present in an amount of about 0.4 wt % or less, whereby the potassium sulfate contains more than 51% potassium, calculated as $K_2O$.

Apart from the acid component, preferably no other additives are mixed with the potassium sulfate in substantial amounts.

It is preferred that no additives are necessary to be added after the crystallization step for obtaining good solubility characteristics.

Preferably, the particle size of the crystalline material is controlled in the crystallization step to be within the ranges provided, optionally with sieving and/or grinding, preferably by sieving only. In a most preferred embodiment, no sieving and/or grinding is necessary, and the particle size is controlled in the crystallization step to be within the ranges provided.

Dust can be measured with a commonly used apparatus such as a Heubach dust meter, and generally comprises particles smaller than about 10 μm.

Preferably the method of the invention essentially consists of the following steps crude potassium sulfate is dissolved, the dissolved potassium sulfate is subjected to a solid material removal step, potassium sulfate is crystallized, while an acid is provided before, during or after the crystallization step of the potassium sulfate whereafter the obtained potassium sulfate is separated and dried wherein the particle size of the crystalline material is controlled to be within the ranges provided, optionally with sieving and/or grinding, preferably by sieving only, such that the resulting potassium sulfate crystalline material conforms with the parameters as described.

"Essentially consisting of" means that no other process steps are required for achieving the properties as described, or wherein any additional steps would have minor influence on the characteristics claimed, like about 20% or less, or about 10% or less, and more preferably about 5% or less relative to the obtained value without the additive. The addition of components or steps that are not related to the invention, like for example the addition of other fertilizer, is not to be considered for the consisting essentially of language.

In one preferred embodiment of the invention, dissolving of crude potassium sulfate is done at elevated temperature, such as for example at 50° C. or higher, while crystallization is done at lower temperature, for example at a temperature of below 50° C.

In an alternative embodiment, dissolution can be done at ambient or slightly elevated temperature, such as for example at 20-50° C., and crystallization is effected by evaporation, while having the crystallizing mixture at about the same or only slightly lower temperature, such as about 20° C. Evaporation generally is effected by applying vacuum in multiple effect evaporators.

These two embodiments can be used in combination, wherein the crude potassium sulfate is dissolved at elevated temperature, while crystallization is forced through cooling and evaporation of the solvent.

The process of the present invention allows a one-step recrystallization without the need for mixing steps after the crystallization step. Further, only acid is needed for improvement in pH, which may aid the solubility characteristics and the performance of the dissolved fertilizer when applied to an agricultural crop.

The addition of acid can be done before, during or after the crystallization, before separating the crystals. Adding acid at this stage is counterintuitive, as the solubility of the potassium sulfate increases, and therefore crystallization is hampered.

DETAILED DESCRIPTION OF THE INVENTION

The term "about" means plus or minus 20%, preferably plus or minus 10%, more preferably plus or minus 5%, most preferably plus or minus 2%.

The present invention provides a method for producing potassium sulfate by recrystallization of crude potassium sulfate wherein crude potassium sulfate contains an amount of potassium, calculated as $K_2O$ of about 15 wt % or higher, preferably of about 40 wt % or higher, and has either:

more than 0.07 wt % insoluble material, and/or a dissolution speed wherein at 3 min dissolution of 100 gram product in 1 L cold water (20° C.) with stirring, the amount of dissolved potassium sulfate is less than 90% and/or a pH of about 6 or higher as a 1% dissolved crude potassium sulfate.

Such quality of potassium sulfate regularly is obtained from processes based on leaching of brines, but can also be obtained from other processes.

The method according the invention is in particularly useful for crude potassium sulfate that both has more than 0.07 wt % insolubles, and a dissolution time of more than 3 min for 90% of the potassium sulfate.

The method according the invention is in particularly useful for crude potassium sulfate that has more than 0.1 wt % insolubles.

The method according the invention is in particularly useful for crude potassium sulfate that has a dissolution time of more than 3 min for 80% of the potassium sulfate.

The method according the invention is in particularly useful for crude potassium sulfate that has a dissolution time of more than 3 min for 70% of the potassium sulfate.

The method according the invention is in particularly useful for crude potassium sulfate that has a pH of about 6 or higher as a 1% dissolved crude potassium sulfate, such as a pH of 7 or higher.

The method according the invention is in particularly useful for crude potassium sulfate that comprises several of the above characteristics, such as a combination of more than 0.1 wt % insolubles, and a pH of about 7 or higher, and dissolution time of more than 3 min for 90% of the potassium sulfate.

The test for measuring the amount of insolubles is comparable to the test for dissolution and comprises dissolving 100 gram of the product in one liter of water at 20° C., while stirring is applied. The solution is filtered over an about 2 micron filter and the filter is washed. The weight gain of the filter (measured after drying) is the amount of insolubles.

The crude potassium sulfate generally contains an amount of potassium, calculated as $K_2O$ of about 15 wt % or higher, preferably about 25 wt % or higher and even more preferably about 40 wt % or higher, and most preferably of about 45 wt % or higher. Generally, the amount of potassium calculated as $K_2O$ will be about 54 wt % or less. Preferred amounts range between 30 wt % and 54 wt %, preferably 40 wt % and 54 wt % and more preferably between 45 and 54 wt %, most preferably 48 and 53 wt %.

The amount of chlorine in the crude potassium sulfate generally is about 5 wt % or less, more preferably about 3 wt % or less. Particularly preferred are amounts of about 1 wt % or less, in particular for crops that are sensitive for chlorine, such as beans, citrus fruit, tree nuts, strawberries or other berries, tobacco, peaches and other stone fruits, apples, avocados, carrots, mango, onions and the like.

The method according to the invention comprises several steps as described and preferably essentially consists of the steps described.

First, crude potassium sulfate is dissolved.

In one embodiment of the invention, dissolution is effected at elevated temperature. This temperature generally will be about 50° C. or higher 60° C. or higher, preferably 70° C. or higher. Generally, water is used as solvent, and the temperature will be about 100° C. or lower, preferably about 95° C. or lower, like for example about 95° C. or 90° C. A suitable temperature includes about 80° C., about 85° C. and the like. The solvent generally comprises recirculated process streams, and in particular at least comprises the mother liquor of the crystallization.

In an alternative embodiment, crude potassium sulfate is dissolved at about ambient temperature or slightly higher, such as for example at 20-50° C. or 20-40° C.

Thereafter, the dissolved potassium sulfate is subjected to a solid material removal step. The removal of solid material can be performed in several ways, such as for example through filtration or centrifugation.

A filtration method is not particularly limited. Filtration can for example be done over plate filters, like glass filters or the like, that have a filter cut-off of between 2-20 µm, for example of about 3-12 µm. Filtration can also be performed under pressure and/or with cross flow filtration.

Centrifugation can for example be done at 1000 to 5000 G, preferably 1700 to 4000 G, like for example 2000 G or 3000 G.

Preferably, an acid is provided before, during or after the crystallization step of the potassium sulfate (but before the separation step). An acid is not always necessary, as the improvement of the present invention can be obtained without the addition of an acid. However, preferably, the potassium sulfate of the invention has a pH below 6, and even more preferable of about 5 or lower.

The acid preferably is added during the dissolution step, hence before the crystallization step. Such acid may be sulfuric acid, phosphoric acid, nitric acid, potassium biphosphoric acid, potassium bisulfate, citric acid, fulvic acid and the like. Sulfuric acid, nitric acid or potassium bisulfate are preferred acids.

The amount of acid preferably is such, that a pH of about 6 is provided, and/or that the pH is lowered by at least one pH unit. Hence, the crude potassium sulfate can have a pH of 9. In such a case, an improvement is provided if the obtained potassium sulfate after recrystallization has a pH of 8 or lower.

More preferably, an amount of acid is provided to achieve a pH of about 7 or lower, and even more preferable of about 6 or lower.

Surprisingly, the presence of an acid increases the solubility of potassium sulfate, improves efficiency in use as foliar spray or in fertigation, and improves cleanliness of spraying or drip, bubbler and or micro-fertigation equipment. In order to keep a high amount of potassium, it is preferred to keep the amount of additive as low as feasible, and as far a metal-ion is to be used, preferably a potassium salt is used.

A skilled person can easily ascertain the amount of acid necessary to achieve the required pH.

Potassium sulfate is crystallized at lower temperature, such as a temperature below 50° C., preferably below 30° C. and more preferably at about 25° C. or lower.

In one embodiment of the invention, the main driving force for crystallization is lowering of the temperature.

In an alternative embodiment, the main driving force for crystallization is evaporation of water.

Obviously, lowering the temperature and evaporation can be combined, to increase the efficiency of the crystallization.

In the first embodiment, the temperature difference between the high and low temperature preferably is about 45° C. or more, preferably about 55° C. or more. Generally, the temperature difference will be about 100° C. or less, preferably about 80° C. or less, like for example 60° C. A larger temperature difference increases the relative amount of crystallized potassium sulfate, but increases the energy requirement for heating and cooling the mixtures. A skilled person will be able to optimize the process conditions.

The time required for the cooling process is preferably about 2 hours or less, and more preferably about 1 hr or less in batch processes. A relative short time is preferred, in particular for obtaining relatively small crystals. Smaller crystals result in faster soluble potassium sulfate.

Alternatively, or in addition, seed crystals can be used to initiate crystallization.

The residence time in a continuous process can be determined by the average skilled person by experimentation.

Crystallization can be performed in a tank, but also on a cooled rotary drum. Suitable tanks include draft tube baffle crystallizers to allow continuous crystallization with a relatively narrow particle size distribution. The crystallizer may include multiple effect evaporating units.

By dissolving the low quality, crude potassium sulfate and removing insoluble material, one of the requirements is achieved of having low amounts of insoluble components.

The crystallization with the preferred addition of the acid component should be done in a way that the following properties are obtained: (i) a 1% solution of the potassium sulfate has a pH below 7, preferably below 6, and more preferably below 5, and (ii) the fraction obtained after crystallization has an average particle size within the following parameters: (a) d90 of about 0.6 mm or lower, preferably about 0.5 mm or lower, (b) d10 of about 0.02 mm or higher, and (c) whereby dust is present in amount of less than 0.4 wt %, preferably less than 0.2 wt %.

If the process is performed in a suitable way, the skilled person is able to obtain potassium sulfate which contains more than 51% potassium, calculated as $K_2O$. Preferably the amount of potassium sulfate is about 51.2% or more, more preferably about 52% or more.

Apart from the acid component, preferably no other additives are mixed with the potassium sulfate in substantial amounts for influencing the relevant parameters, and preferably none at all. Non substantial amounts are amounts that do not alter the main properties of the potassium sulfate which are described in the claims.

Preferably, the particle size of the crystalline material is controlled to be within the ranges provided by the crystallization step, optionally with sieving and/or grinding, preferably by sieving only.

More preferably, the only steps necessary for obtaining the largest part of the potassium sulfate with the particle size required by the claims is using the crystallization step. A sieving step may be employed, but preferably only for removing a relatively small fraction of oversized crystalline material.

The crystallization is performed is such a way that generally about 5 wt % or less is obtained as oversized material, more preferably about 2 wt % or less. The oversized material may be redissolved in the heating step, or may be ground to smaller particles.

Preferably, no grinding step is used, as grinding is costly, and causes many fines (dust), that may deteriorate the properties of the powder.

Alternatively, the crystalline material may contain a wide range of crystal sizes, and the product is sieved and ground. However, grinding is less preferred, as relatively large amounts of dusty particles are produced, which preferably are removed from the product stream, and recirculated.

The process of the present invention allows a one-step recrystallization without the need for mixing steps after the crystallization step.

As explained, acid is provided for improvement in dissolution and optimizing foliar spray or fertigation efficacy.

In the general method of the invention, the fraction obtained after crystallization has an average particle size within the following parameters: d90 of about 0.6 mm or lower, preferably about 0.5 mm or lower, with a d10 of about 0.02 mm or higher, while particles smaller than about 10 μm amount to less than 0.4 wt %, preferably less than 0.2 wt %.

In a further preferred embodiment, the d90 is about 0.45 mm or lower, and even more preferred about 0.35 mm or lower.

After crystallization, the obtained crystalline material is separated from the mother liquor, optionally washed and dried. Thereafter, a sieving, or optionally a grinding and sieving step may be performed.

Preferably, particles of about 1 mm or larger are removed by for example sieving.

The angle of repose of the potassium sulfate generally will be between 42-33 degrees. In one preferred embodiment, the angle of repose will be about 40 degrees.

The mother liquor is recycled to the dissolution tank. In the dissolution tank, additional water and crude potassium sulfate is added. In a high-temperature dissolution, low-temperature process, the concentration of potassium sulfate leaving the dissolving tank in a continuous process may for example be about 190-240 g/L potassium sulfate, while the mother liquor may for example contain about 100-130 g/L potassium sulfate.

In a specific preferred embodiment, potassium sulfate powder is provided wherein about 80 wt % or more of the powder has a particle size of about 0.2 mm or lower, preferably about 0.13 mm or less.

The particle size preferably is such, that about 80 wt % or more is about 0.02 mm or higher, more preferably about 0.04 mm or higher.

This powder preferably has a bulk density (loose) of about 1.10, and struck (tapped) of about 1.44. This embodiment is preferred because potassium sulfate powder wherein about 80 wt % or more of the powder has a particle size of about 0.2 mm or lower dissolves easily in water, more in particular, 40 gram of said potassium sulfate powder dissolves in 1 liter of water without stirring within 1 minute, preferably within 30 sec.

More preferably, the potassium sulfate powder according the invention is a powder wherein about 95 wt % or more, even more preferred about 98% or more of the powder has a particle size of about 0.2 mm or less, preferably 0.13 mm or less.

The potassium sulfate powder according the invention is preferably a powder wherein about 90 wt % or more of the powder has a particle size of about 0.02 mm or more, preferably about 0.04 mm or more.

Preferably, about 10 wt % or less, more preferable about 5 wt % or less of the potassium sulfate is less than 0.045 mm.

Preferably, about 15 wt % or less, and more preferably about 10 wt % or less, and even more preferable about 5 wt % or less of the powder is larger than 0.125 mm.

Generally, the potassium sulfate powder of the invention has a bulk density (loose) of about 1.10 to about 1.25, and struck (tapped) of about 1.43-1.48.

Generally, the angle of repose of the potassium sulfate of the invention is about 34 to 43 degrees.

The preferred powder has more than 90 wt % of the powder (d10) of a size of 0.025 mm or higher. This is very advantageous to preclude dusting, and caking.

The potassium sulfate obtained with the method according the invention has good solubility properties, which means that in a test wherein 100 gram of potassium sulfate is dissolved in 1 L of water (at 20° C.), more than 70% is dissolved in 3 minutes. Preferably, more than 80% is dissolved, and even more preferably, more than 85% is dissolved, and most preferably, about 90% or more is dissolved.

In a further preferred embodiment, more than 70% is dissolved in one minute, preferably more than 80% is dissolved in 1 minute, and most preferably, more than 85% is dissolved in one minute.

It is particularly preferred, that the pH of the solution of a 1 wt % solution is about 6 or less, preferably about 5 or less, and most preferably about 4.5 or less. Generally, the pH will be about 2 or higher, preferably about 2.5 or higher. A slightly acidic solution is an advantage, because the dissolution speed may be increased in comparison to a potassium sulfate that dissolves with a pH of about 6 or higher, and the total amount of dissolvable potassium sulfate increases which allows a higher concentrated solution to be sprayed or fertigated. Also, the slightly acidic solution precludes blocking in the equipment, and even has a cleaning effect in the equipment.

The potassium sulfate obtained with the process of the present invention may have an average amount of potassium, calculated as $K_2O$, of about 51 wt % or more, preferably of about 51.2 wt % or more, and even more preferably about 52 wt % or more. Generally, the amount of potassium calculated as $K_2O$ will be about 55 wt % or less, preferably about 54 wt % or less.

The potassium sulfate obtained with the process of the present invention may have an amount of sulfur, calculated as $SO_4$, of about 54 wt % or more, preferably of about 55 wt % or more. Generally, the amount of sulfur calculated as $SO_4$ will be about 60 wt % or less, preferably about 58 wt % or less.

The amount of chloride in the potassium sulfate of the present invention generally may be about 3 wt % or less, preferably about 1 wt % or less, and more preferably about 0.5 wt % or less. Higher amounts of chloride can cause leaf-burn, which is to be precluded.

The potassium sulfate powder according to the present invention preferably conforms with the above characteristics in combination, and a man skilled in the art will realise that selections from the higher and lower values can be combined, and that these can be combined with other characteristic as described in this patent application.

The invention furthermore provides for a method of growing crop, comprising the application of a potassium sulfate powder as described above, wherein about 90 wt % or more of the powder has a particle size of about 0.6 mm or lower, and wherein about 10 wt % or less has a particle size of about 0.02 mm or higher, and wherein the powder is dissolved in water, to crops.

The invention furthermore provides a method of improving the yield of crop, wherein potassium sulfate powder as described above is dissolved in water, wherein about 90 wt % or more of the potassium sulfate powder has a particle size of 0.6 mm or lower, and wherein the d10 is about 0.02 mm or higher, after which the solution is applied to said crop.

In preferred embodiments these methods use preferred potassium sulfate products as described.

In a preferred embodiment of the invention, a spray solution is prepared by filling the main tanks of a spray apparatus for 50-80% with water, adding the potassium sulfate according the invention, and further adding water to fill the tank to about 100% of the required amount.

In case the fertilizer is used as foliar spray or in fertigation equipment, it generally will be applied as about 0.4-11 wt % solution of potassium sulfate (which is about 4 to about 110 g/L), although other amounts are feasible. For example, preferred amounts include about 1%, 2%, 3%, 4%, 5% or 6% by weight.

With foliar spray, an amount of water per hectare is generally about 300 L/ha (i.e. about 32 gal/acre). In case lower amounts of water are to be applied, like for example 100 L/ha, or 200 L/ha, the concentrations may be higher. Suitable high concentration amounts include for example up to 6%, 8% or 10%, or even 11%, although amounts lower than 8% are preferred. For fertigation, regular supply of water is combined with the supply of dissolved potassium sulfate. The concentration of potassium sulfate generally is between 10-400 mg/liter, like for example 40, 80 or 200 mg/liter. The solution is regularly supplied to crop, with daily application rates of 1-10 kg/hectare, like for example 1.5, 2, 2.5 4, or 6 kg/hectare, depending on the crop and the growth stadium. Generally, the daily supply solution is made from a stock solution, which is highly concentrated, like having for example 10 kg per 100 liter of water.

The solubility of potassium sulfate in water at 20° C. is about 130 gr/L, depending on the pH of the solution. Preferably, the amount used is about 120 g/L or less. It appears that the potassium sulfate according the invention dissolves quickly, even if concentrations are used close to the maximum solubility.

With fertigation, a grower can chose to have fertilizer in its fertigation water at a more or less continuous basis at relatively low concentration, or non-continuous, such that higher concentrations may be preferred.

The potassium sulfate according the invention may be applied in an amount of about 0.8 kg or more per acre per application (i.e. about 2 kg or more per hectare per application).

In a preferred embodiment, the amount applied per acre is about 1.2 kg per acre, preferably 2 kg/acre, or more per application (i.e. about 3 resp. 5 kg or more per hectare per application).

The potassium sulfate according the invention may be applied in an amount of about 10 kg or less per acre per application (i.e. about 25 kg or less per hectare per application).

In a preferred embodiment, the amount applied per acre is about 8 kg per acre or less per application (i.e. about 20 kg or less per hectare per application).

Optimal amounts of the potassium sulfate according the invention will depend on the specific crop, and include foliar application of about 5, about 8, about 10, about 12, about 15, about 18 or about 20 kg/ha/application.

The potassium sulfate will be dissolved in water in amounts suitable to achieve the amounts per acre described hereinbefore. The actual concentration will depend on the amount of liquid that will be applied by the farmer on its crops. Suitable amounts of water per acre on crops include between about 10 and about 40 gal/acre (about 40-160 L/acre, which is about 100 to 400 L/ha). To apply suitable amounts of potassium sulfate according the present invention, the concentration preferably is between about 1% by weight and about 10% by weight.

For fertigation the amounts per hectare per day generally vary between 1-10 kg/hectare, like for example 1.5, 2, 2.5 4, or 6 kg/hectare, depending on the crop and the growth stadium. Generally, the daily supply solution is made from a stock solution, which is highly concentrated, like having for example 10 kg per 100 liter of water. The concentrated solution is thereafter added to the water for fertigation in for example 0.5, 0.8 or 1 wt.

The source of water is not limited, and can be well-water, river water, rainwater, tap water or the like. The water to be used should preferably not have high calcium concentration, because calcium sulfate (gypsum) may precipitate. The allowable amount of calcium will depend on the concentration of potassium sulfate aimed for in the foliar spray or in the dissolved fertilizer for fertigation.

If used as foliar application, the potassium sulfate according to the present invention may be applied once, twice, three times, four times or more often during the growth of the crop. Generally, one, two or three applications will be adequate to clearly improve the yield per acre. If used in fertigation, the application can be more regular.

In a preferred embodiment, the application of the potassium sulfate as foliar application according the present invention is combined with the application of a growth regulator or pesticide such as an insecticide or fungicide. The growth regulator or pesticide can be tested beforehand, to check compatibility with the potassium sulfate solution. In particular, such further compound should not comprise calcium.

In a preferred embodiment, the application of the potassium sulfate in fertigation according the present invention is combined with the application of other fertilizers and products. These products can be tested beforehand, to check compatibility with the potassium sulfate solution. In particular, such further compound should not comprise calcium.

In a preferred embodiment, the potassium sulfate is applied as foliar application at suitable periods during growth of the crop. Preferably, such suitable period is around the start of flowering, start of forming tubular crop, during extensive growth periods, like after forming 4 leaves in maize, and the like.

Potassium sulfate can be applied as foliar spray on traditional crops and on broad acre crops.

Crops for fertigation include traditional crops such as fruits, like strawberry, citrus and stone or pomme fruits, vegetables like beans, Cucurbitaceae, tomatoes, tea, coffee, tobacco and the like.

Traditional crops include fruit, like peach, prune or other stone fruit, citrus fruit, apples, pears, grapes, pineapple, strawberries, raspberries or other berries, and other crops such as olives, carrots, onions, lettuce, peas, peppers, cabbage, cucumber, broccoli, cauliflower, asparagus and the like.

Broad acre crops include tuber or root crops such as potatoes and sugar beet; cereal crops like maize, rice, wheat, barley, grain and the like; or oil crops, like soy bean, sunflower, rapeseed or peanut, or other crops like clover, mustard or cotton and the like.

In one preferred embodiment of the invention, the potassium sulfate according the invention is applied on potatoes or sugar beets.

In another preferred embodiment of the invention, the potassium sulfate according the invention is applied on maize, wheat, rice or barley.

In another preferred embodiment of the invention, the potassium sulfate according the invention is applied on soy bean, sunflower, rapeseed or peanut.

In another preferred embodiment of the invention, the potassium sulfate according the invention is applied on clover, mustard or cotton.

In another embodiment, the potassium sulfate of the present invention is applied to vegetables, such as faba bean or tomatoes.

In another embodiment of the invention, the potassium sulfate according the invention is applied to tobacco.

In another embodiment, the potassium sulfate of the present invention is applied to fruit crops such as avocado, banana, citrus, grape, pineapple, pome fruits or stone fruits, strawberry and the like.

In another embodiment, the potassium sulfate of the present invention is applied to vegetables such as olives, carrots, onions, lettuce, peas, peppers, cabbage, cucumber, broccoli, cauliflower, asparagus and the like In case the potassium sulfate is applied more than once as foliar application, a further application is preferably between about 7 days up to about 20 days from the earlier application, but may also be up to about 30 days after application of the earlier application or even longer. If used in fertigation, the application can be more regular.

Further modifications in addition to those described above may be made to the structures and techniques described herein without departing from the spirit and scope of the invention. Accordingly, although specific embodiments have been described, these are examples only and are not limiting upon the scope of the invention.

EXAMPLES

Measurement Methods

Dissolution speed: 100 g potassium sulfate is dissolved in 1000 ml water in a beaker (height 18 cm, diameter 9 cm) while stirring at 250 rpm with a mechanical stirrer (diameter 5 cm) at 2 cm from the bottom. The dissolution is registered based on conductivity measurement every 30 seconds till a plateau is reached. The conductivity can be measured with a Cond 340i of WTW with a Tetracon 325 electrode (1 $cm^2$ electrodes at 1 cm distance), positioned at about 600 ml height of the 1 L content; the electrode should be calibrated. 100 g ultrapure potassium sulfate fully dissolved has a conductivity of 81 S/cm ($\Omega^{-1}cm^{-1}$). In the calculation, furthermore corrections should take into account for a decrease in temperature of a few degrees Celsius, and of the non-linear ionization. These standard correction factors provided in the software belonging to for example the Cond 340i.

The pH is measured with a standard pH electrode.

Insolubles are measured by preparation of a 10% solution (100 g potassium sulfate in 1000 ml water) at 20° C. with stirring till all potassium sulfate is dissolved. The solution is filtered over a GF92 filter, and the filter is washed once with some demiwater. The filter is dried in an oven till a constant weight, and the difference in weight of the filter before and after filtration is the measure of the amount of insoluble. The pore size of a GF92 filter is between 1 and 3 μm, with an average of 2.5 μm.

Dust measurement is performed with a Heubach dustmeter. A sample is brought into a rotating drum. A vacuum pump creates an air flow through the rotating drum, the connected glass cylinder and the attached filter unit. By the air flow, dust particles are transported out of the rotating drum through the glass cylinder and subsequently through the filter unit. Coarse non-floating particles are separated and collected in the glass cylinder while floating particles are deposited onto a filter. The amount of floating dust collected on the filter is determined gravimetrically and is considered dust.

Particle size distribution is measured with a sieve analysis, and the values are the weight amounts, meaning that for example for the d10, that 10 wt % of the product has a smaller size than the measured d10, and 90 wt % has a size larger than that d10. The values are given in mm.

Reference Experiments A-C

Reference experiment A is an untreated potassium sulfate (SOP) with relatively poor solubility characteristics. As is clear from tables 1 and 2, the time to solubilize 70% of 100 gram of SOP in 1 L of water takes more than 3 min, while the amount of insoluble material is more than 0.1 wt %. It is possible to increase the solubility by sieving the material, and removing larger particles. In Reference experiment 2, the SOP of reference experiment A is sieved over a 425 μm sieve, yielding 84% of the original amount. The solubility increases, but at the same time also the amount of insoluble material increases. This effect is more pronounced in case the product of reference experiment A is sieved over a 125 μm sieve. Such a product having small particles, assuming no dust, dissolves quickly, but the amount of insoluble material increases to 0.3 wt % (reference experiment C).

Reference Experiments D-E

In these experiments, 2 litre water and 420 g SOP of reference experiment A was dissolved at a temperature of 80° C. The solution was filtered over a MN640 filter (4-12 μm). The filtrate was cooled in by external cooling, to about 25° C., and the obtained crystalline material was filtered over a MN640 filter and dried. The obtained amount was 155.5 g (Reference experiment D).

All in-process filtrations described below have been done with the MN640 filter.

The filtrate obtained after the first crystallization (about 1.8 L) was again heated to 80° C. while a further 155 gram of SOP of reference example A was dissolved. After filtration at 80° C., the filtrate was allowed to be cooled by external cooling to about 25° C. and the obtained crystalline material was filtered and dried. The obtained material amounts to 165.6 g (Reference experiment E).

Example 1

The filtrate from reference experiment D (about 1.6 L) was mixed with 200 g concentrated $HNO_3$ and a further 400 g potassium sulfate of reference experiment A was dissolved at 80° C. This solution was filtered at this temperature, and thereafter the solution was allowed to cool by external cooling to about 25° C. The obtained crystalline material was filtered and dried, and 159.5 g product was obtained (Example 1).

Examples 2-4

1600 ml demiwater with 200 g concentrated $HNO_3$ was mixed with 550 g potassium sulfate of reference experiment A and the mixture was heated till 80° C. to dissolve the potassium sulfate. The solution was filtered while at 80° C., and the filtrate was fastly cooled with external cooling with water/ice at to a temperature of 15° C. The obtained crystalline material was filtered and dried and 113.8 g dry product was obtained (Example 2).

The filtrate obtained in Example 2 was heated again to 80° C. and a further 200 g potassium sulfate of reference experiment A was dissolved. It is noted that not all material was dissolved. The hot solution was filtered and the filtrate was fastly cooled, as in example 2 to 15° C. The obtained crystalline material was filtered and dried. The amount of product after drying was 190.1 g (Example 3).

The filtrate was thereafter heated to 80° C. and a further 150 g potassium sulfate of reference experiment A was dissolved. The solution was filtered when hot, and the filtrate was cooled with external cooling to 20° C. The crystalline material was filtered and dried, which yielded 152.1 g material (Example 4).

Reference Experiment F and Example 5

A mixture of 1800 ml water and 420 g potassium sulfate of reference experiment A was heated till about 80° C., and the solution was filtered when hot. The filtrate was cooled with external cooling to about 25° C. in about 30 minutes. The crystalline material was dried, and amounted to 153.1 g (reference experiment F).

The filtrate of reference experiment F was mixed with 100 g $H_3PO_4$ (85%) and with 250 g potassium sulfate of reference experiment A, and the mixture was heated till 80° C. The hot solution was filtrated, and thereafter cooled to about 25° C. (in about 30 minutes, external cooling with water of about 15° C.). A crystalline solid was obtained (after drying, 168.1 g; Example 5).

Examples 6 and 7

A mixture of 1800 ml water with 200 g $H_2SO_4$ (98.8%) and 700 g potassium sulfate of reference experiment A was heated till 80° C. Most, but not all of the potassium sulfate dissolved. The solution was filtered when hot, and the filtrate was cooled to about 25° C. (in 120 minutes by external cooling). The solid crystalline material obtained weighed 228.1 g (Example 6).

The filtrate was again heated to 80° C. and a further 200 g potassium sulfate of reference experiment 1 was dissolved. The solution was filtrated when hot, and the solution was cooled with external cooling to about 25° C. (in 30 minutes). An amount of 190.4 g crystalline material was obtained (Example 7)

Reference Experiments G H and I

A good grade of potassium sulfate of Tessenderlo Chemie was used as reference material as such (Solupotasse®) (reference experiment G)

A mixture of 1800 ml water and 420 g potassium sulfate of reference experiment G was heated to 80° C., and the solution was filtered when hot. The filtrate was cooled with external cooling to about 25° C. (in 30 minutes). An amount of 151.3 g of crystalline dry product was obtained (reference experiment H), and 2025 g filtrate.

The filtrate with 35 g water and 160 g potassium sulfate was heated to 80° C. and when dissolution was complete, the solution was filtered when hot. The filtrate was cooled with external cooling till about 25° C. (in 30 minutes). An amount of 154.9 g (after drying) was obtained (reference experiment I).

CONCLUSIONS

It appears from reference experiments G-I that recrystallization of good soluble SOP actually deteriorates the solubility characteristics, probably because acid is removed and/or powder characteristics are less optimal after recrystallization. It furthermore appears that with recrystallization and filtration solubility characteristics can be improved, assuming proper crystal size is obtained. However, the pH remains less preferred. With the examples according to the present invention, all required characteristics can be achieved with one recrystallization.

Results are given in the following tables 1 and 2. In Table 1, the amount of potassium in the product, given as % $K_2O$, the pH of a 1% solution, and the particle size distribution is given. In Table 2, the dissolution speed, measured by dissolving 100 gram product in one liter of water; the amount of dissolved material was measured after 1 minute, and after 3, 5 and 10 minutes as described above. Further, the amount of insoluble material was measured (after dissolving 100 g in 1 litre of water at 20° C.).

TABLE 1

| experiment number | % K2O | pH 1% | d10 | d50 | d90 |
| --- | --- | --- | --- | --- | --- |
| ref exp A | 53.2 | 5.1 | 0.092 | 0.26 | 0.656 |
| ref exp B | " | " | n.d | n.d. | n.d. |
| ref exp C | " | " | n.d. | n.d. | n.d. |
| ref exp D | " | 5.0 | 0.077 | 0.23 | 0.403 |
| ref exp E | " | 4.9 | 0.07 | 0.174 | 0.341 |
| Example 1 | " | 3.7 | 0.06 | 0.147 | 0.28 |
| Example 2 | " | 3.9 | 0.055 | 0.11 | 0.168 |
| Example 3 | " | 3.2 | 0.124 | 0.273 | 0.525 |
| Example 4 | 53.62 | 3.65 | 0.045 | 0.108 | 0.188 |
| ref exp F | 53.91 | 5.3 | 0.051 | 0.14 | 0.23 |
| Example 5 | 53.82 | 3.9 | 0.048 | 0.146 | 0.25 |
| Example 6 | 53.35 | 3.4 | 0.11 | 0.23 | 0.405 |
| Example 7 | " | 3.5 | 0.098 | 0.225 | 0.395 |
| ref exp G | 51.7 | 2.7 | 0.072 | 0.15 | 0.38 |
| ref exp H | n.d. | 4.3 | 0.061 | 0.155 | 0.46 |
| ref exp I | n.d. | 4.4 | 0.14 | 0.332 | 0.543 |

TABLE 2

| experiment number | 1' | 3' | 5' | 10' | % insol. | % dust |
|---|---|---|---|---|---|---|
| ref exp A | 51 | 65.6 | 75.1 | 87.2 | 0.13 | 0.452 |
| ref exp B | 59.6 | 77.2 | 87.2 | 96.9 | 0.16 | Idem |
| ref exp C | 94.4 | 99.7 | 99.8 | 100 | 0.33 | Idem |
| ref exp D | 59.1 | 87.3 | 95.8 | 99.4 | 0.0023 | n.d. |
| ref exp E | 87.6 | 97.8 | 99.1 | 99.7 | 0.0079 | n.d. |
| Example 1 | 74.1 | 94.3 | 97.5 | 99.4 | 0.0225 | n.d. |
| Example 2 | 87.3 | 96.6 | 98 | 99.1 | 0.0065 | n.d. |
| Example 3 | 65.9 | 92.0 | 97.6 | 99.7 | 0.0007 | n.d. |
| Example 4 | 81.4 | 95.4 | 98.3 | 99.8 | 0.02 | n.d. |
| ref exp F | 84.3 | 98.5 | 99.5 | 99.8 | 0.004 | 0.114 |
| Example 5 | 86.3 | 98.8 | 99.7 | 99.9 | 0.0076 | 0.118 |
| Example 6 | 59.2 | 87.4 | 94.4 | 98.6 | 0.012 | 0.087 |
| Example 7 | 60.9 | 87.5 | 95.1 | 98.9 | 0.0092 | 0.065 |
| ref exp G | 80.7 | 92.7 | 95.9 | 99.7 | 0.034 | 0.0322 |
| ref exp H | 63.4 | 81.3 | 87.5 | 93.8 | 0.0015 | 0.076 |
| ref exp I | 33.8 | 60.6 | 75 | 89.9 | 0.014 | 0.053 |

What is claimed is:

1. A method for producing potassium sulfate by (re)crystallization of crude potassium sulfate wherein the crude potassium sulfate contains an amount of potassium, calculated as K₂O of about 15 wt % or higher, and has either:
more than about 0.07 wt % insoluble material, and/or
a dissolution speed wherein at 3 min dissolution of 100 gram product in 1 L water of 20° C. with stirring, the amount of dissolved potassium sulfate is less than 90%, and/or
wherein a 1% dissolved crude potassium sulfate has a pH of about 6 or higher
wherein the method comprises the following steps
crude potassium sulfate is dissolved,
the dissolved potassium sulfate is subjected to a solid material removal step,
potassium sulfate is crystallized,
while optionally an acid is provided before, during or after the crystallization step of the potassium sulfate
whereafter the obtained potassium sulfate is separated and dried
wherein the particle size of the crystalline material is controlled to be within the ranges provided, optionally with sieving and/or grinding,
such that the resulting potassium sulfate crystalline material conforms with the following characteristics:
the amount of insoluble material is less than about 0.05 wt %,
a 1 wt % solution of the potassium sulfate has a pH below about 6, and/or at least 1 pH unit lower than the pH of the crude potassium sulfate,
the fraction obtained after crystallization has an average particle size within the following parameters:
d90 of about 0.6 mm or lower, and
d10 of about 0.02 mm or higher, and
dust amount to about 0.4 wt % or less,
whereby the potassium sulfate contains more than about 51% potassium, calculated as K₂O.

2. The method according to claim 1, wherein the method consists essentially of the following steps:
crude potassium sulfate is dissolved,
the dissolved potassium sulfate is subjected to a solid material removal step,
potassium sulfate is crystallized,
while optionally an acid is provided before, during or after the crystallization step of the potassium sulfate,
whereafter the obtained potassium sulfate is dried,
wherein the particle size of the crystalline material is controlled to be within the ranges provided, optionally by sieving and/or grinding,
such that the resulting potassium sulfate crystalline material conforms with the parameters as described.

3. The method according to claim 1, wherein dissolution is effected at elevated temperature of about 50° C. or higher, and crystallization is effected by cooling the mixture to a temperature of below 50° C.

4. The method according to claim 1, wherein dissolution is effected at ambient or slightly elevated temperature of between 20 and 50° C., and wherein crystallization is effected by evaporation of water.

5. The method according to claim 1, wherein the particle size of the crystalline material is controlled to be within the ranges provided, by sieving only.

6. The method according to claim 1, wherein a 1 wt. % solution of the potassium sulfate has a pH below about 6.

7. The method according to claim 1, wherein the fraction obtained after crystallization has an average particle size within the following parameters: d90 of about 0.5 mm or lower.

8. The method according to claim 1, wherein fraction obtained after crystallization has an amount of particles smaller than about 10 μm less than about 0.2 wt %.

9. The method according to claim 1, wherein the potassium sulfate contains more than about 52% potassium, calculated as K₂O.

10. The method according to claim 1, wherein potassium sulfate powder is provided wherein about 80 wt % or more of the powder has a particle size of about 0.2 mm or lower, wherein about 80 wt % or more is about 0.02 mm or higher.

11. The method according to claim 1, wherein the acid is chosen from potassium hydrogen sulfate, sulfuric acid or nitric acid.

12. The method according to claim 1, wherein the amount of chloride in the potassium sulfate is about 1 wt % or less.

13. A method of growing crop comprising the application of a potassium sulfate powder provided by a method for producing potassium sulfate by (re)crystallization of crude potassium sulfate wherein the crude potassium sulfate contains an amount of potassium, calculated as K₂O of about 15 wt % or higher and has either:
more than about 0.07 wt % insoluble material, and/or
a dissolution speed wherein at 3 min dissolution of 100 gram product in 1 L water of 20° C. with stirring, the amount of dissolved potassium sulfate is less than 90%, and/or
wherein a 1% dissolved crude potassium sulfate has a pH of about 6 or higher
wherein the method comprises the following steps:
crude potassium sulfate is dissolved,
the dissolved potassium sulfate is subjected to a solid material removal step,
potassium sulfate is crystallized,
while optionally an acid is provided before, during or after the crystallization step of the potassium sulfate
whereafter the obtained potassium sulfate is separated and dried
wherein the particle size of the crystalline material is controlled to be within the ranges provided, optionally with sieving and/or grinding, preferably by sieving such that the resulting potassium sulfate crystalline material conforms with the following characteristics:

the amount of insoluble material is less than about 0.05 wt %, a 1 wt % solution of the potassium sulfate has a pH below about 6, and/or at least 1 pH unit lower than the pH of the crude potassium sulfate, the fraction obtained after crystallization has an average particle size within the following parameters:
d90 of about 0.6 mm or lower, and
d10 of about 0.02 mm or higher, and
dust amount to about 0.4 wt % or less, whereby the potassium sulfate contains more than about 51% potassium, calculated as $K_2O$, wherein the potassium sulfate powder is dissolved in water, to crops by fertigation, foliar spray or the like.

14. The method according to claim 13, wherein said potassium sulfate is used for fertigation and/or foliar use on vegetables, fruit, tuber or root crops.

15. The method according to claim 1, wherein the crude potassium sulfate contains an amount of potassium calculated as $K_2O$ of about 40 wt % or higher.

16. The method according to claim 13, wherein the crude potassium sulfate contains an amount of potassium, calculated as $K_2O$ of about 40 wt % or higher.

17. The method according to claim 14, wherein said potassium sulfate is used for fertigation and/or foliar use on, potatoes or sugar beet, cereals like maize, rice, wheat, barley, grain, oil crops, like soy bean, sunflower, rape-seed or peanut, or other crops like clover, cotton, mustard or tobacco.

* * * * *